United States Patent
Kurematsu

Patent Number: 5,890,786
Date of Patent: Apr. 6, 1999

[54] PROJECTION APPARATUS

[75] Inventor: Katsumi Kurematsu, Hiratsuka, Japan

[73] Assignee: Canon Kabushiki Kaisha, Tokyo, Japan

[21] Appl. No.: 932,348

[22] Filed: Sep. 17, 1997

Related U.S. Application Data

[63] Continuation of Ser. No. 425,784, Apr. 20, 1995, abandoned.

[30] Foreign Application Priority Data

Apr. 22, 1994 [JP] Japan .................................. 6-107870

[51] Int. Cl.$^6$ .................................................. G03B 21/14
[52] U.S. Cl. .............................................. 353/20; 353/69
[58] Field of Search .................................. 353/20, 34, 37, 353/38, 84, 102, 69; 359/40, 41, 48, 49; 349/5, 9

[56] References Cited

U.S. PATENT DOCUMENTS

| | | | |
|---|---|---|---|
| 4,913,529 | 4/1990 | Goldenberg et al. | 359/49 |
| 5,231,431 | 7/1993 | Yano et al. | 353/37 |
| 5,272,496 | 12/1993 | Nicolas et al. | 353/20 |
| 5,278,680 | 1/1994 | Karasawa et al. | 359/40 |
| 5,381,278 | 1/1995 | Shingaki et al. | 353/20 |
| 5,387,953 | 2/1995 | Minoura et al. | 353/20 |
| 5,387,991 | 2/1995 | Mitsutake et al. | 359/40 |
| 5,418,583 | 5/1995 | Masomoto | 353/38 |
| 5,446,510 | 8/1995 | Mitsutake et al. | 353/20 |
| 5,452,128 | 9/1995 | Kimura et al. | 353/20 |
| 5,461,500 | 10/1995 | Tsuji et al. | 359/48 |
| 5,467,207 | 11/1995 | Forkner et al. | 353/38 |

*Primary Examiner*—William Dowling
*Attorney, Agent, or Firm*—Robin, Blecker & Daley

[57] ABSTRACT

The present invention relates to a projection apparatus in which a beam of light from light source means is separated into beams of two polarized components by a polarization separator, and the direction of polarization of one of the separated beams of two polarized components is caused to coincide with the direction of polarization of the other beam of light through polarizing rotatable means, whereafter the two beams of light are condensed by a condenser of which the refractive power differs between two directions orthogonal to each other, a projected image is irradiated with the beam of light passed through the condenser and the projected image is projected onto a predetermined surface by a projector.

15 Claims, 5 Drawing Sheets

PROJECTION APPARATUS

This is a continuation application under 37 CFR 1.62 of prior application Ser. No. 08/425,784 filed Apr. 20, 1995, now abandoned.

BACKGROUND OF THE INVENTION

1. Field of the Invention

This invention relates to an illuminating device and a projection apparatus using the same, and is particularly suitable for an apparatus such as a slide projector or a liquid crystal projector adapted to achieve the effective utilization of a beam of light from a light source, illuminate a projected image efficiently and project the projected image onto the surface of a screen by a projection lens.

2. Related Background Art

There have heretofore been proposed various projection apparatuses designed such that the original picture of a projected image displayed on film, a liquid crystal light valve (liquid crystal display element) or the like is magnified and projected onto the surface of a screen.

Of these, there have been proposed various projection apparatuses designed such that in order to enhance the utilization efficiency of light, beams of light from a light source are converted into a polarized beam of light which illuminates the liquid crystal display element.

FIG. 7 of the accompanying drawings is a plan view showing the essential portions of the optical system of a projection apparatus according to the conventional art, and FIG. 8 of the accompanying drawings is a side view showing the essential portions of FIG. 7. These figures shows a case where a transmission type liquid crystal panel (liquid crystal light valve) is used as a projected image 72 and this image is magnified and projected by a projection lens 71.

In FIGS. 7 and 8, the reference numeral 73 designates a white light source comprising, for example, a halogen lamp, a metal halide lamp or the like. The reference numeral 74 denotes a reflector comprising a parabolic or otherwise shaped reflecting surface, which effectively directs a beam of light from the white light source 73 toward a polarizing conversion element 70.

The polarization converting element 70 has the optical function of causing an incident beam of light to emerge as a polarized beam of light (P-polarized light). The polarizing conversion element 70 has a polarizing beam splitter 75 for transmitting P-polarized light therethrough and reflecting S-polarized light, a polarizing rotatable element 77 having a quarter wavelength plate and a reflecting surface for converting the S-polarized light from the polarized beam splitter 75 into P-polarized light and reflecting it, and a reflecting mirror 76.

In FIGS. 7 and 8, a beam of light La including the P-polarized light and S-polarized light from the light source 73 is made into two polarized lights $P_1$ and $P_2$ by the polarizing conversion element 70, and these P-polarized lights $P_1$, and $P_2$ are directed to a condenser lens 78, and a liquid crystal panel 72 is illuminated by a beam of light condensed by the condenser lens 78.

The reference numeral 71 designates a projection lens which projects an image displayed on the liquid crystal panel 72 onto a screen (not shown).

In the projection apparatus shown in FIGS. 7 and 8, the emergent light from the liquid crystal panel 72 is greatly widened in a plane containing both the normal to the polarizing beam splitter 75 and the normal to the reflecting mirror 76 (the plane of the drawing sheet of FIG. 7, hereinafter referred to as the "polarizing conversion plane").

On the other hand, the expanse of the beam of light in a plane perpendicular to the polarizing conversion plane (the plane of the drawing sheet of FIG. 8) is small as compared with that in the polarizing conversion plane. In the projection apparatus according to the conventional art, a beam of light of which the expanses in the polarizing conversion plane and a plane orthogonal thereto differ from each other has been condensed by the condenser lens 78 comprising a spherical lens and the liquid crystal panel 72 has been illuminated by this beam of light. This has led to the problem that the utilization efficiency of the beam of light is low.

SUMMARY OF THE INVENTION

The present invention has as its object the provision of an illuminating device in which when a projected image is illuminated by a beam of light from a light source emerging with its polarized state made uniform by the use of a polarizing conversion element, utilization is made of condensing means having appropriate refractive power, whereby the effective utilization of the beam of light from the light source is achieved and the projected image is efficiently illuminated and thus, a bright projected image can be obtained easily on the surface of a screen, and a projection apparatus using the same.

One aspect of the present invention has information forming means for forming information, illuminating means for illuminating the information forming means, and optical means disposed near the information forming means and differing in refractive powers in directions intersecting each other.

Particularly, a beam splitter is disposed in an optical path leading from the illuminating means to the information forming means. Light transmitted through the beam splitter is directed toward the information forming means by a reflecting mirror. Also, light reflected by the beam splitter has its polarization rotated and is again returned to the beam splitter and is directed toward the information forming means.

DESCRIPTION OF THE PREFERRED EMBODIMENTS

Figure 1:
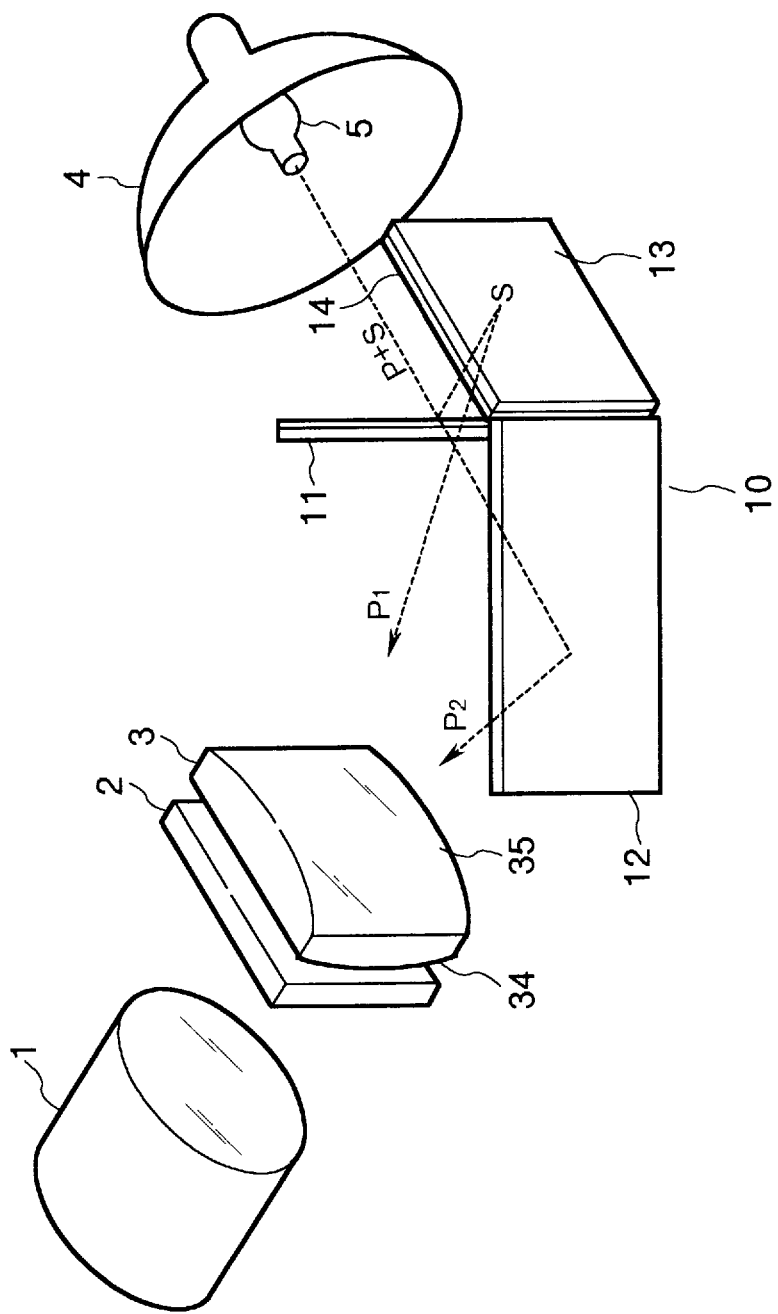
FIG. 1 is a perspective view showing the essential portions of Embodiment 1 of the present invention.
Figure 2:
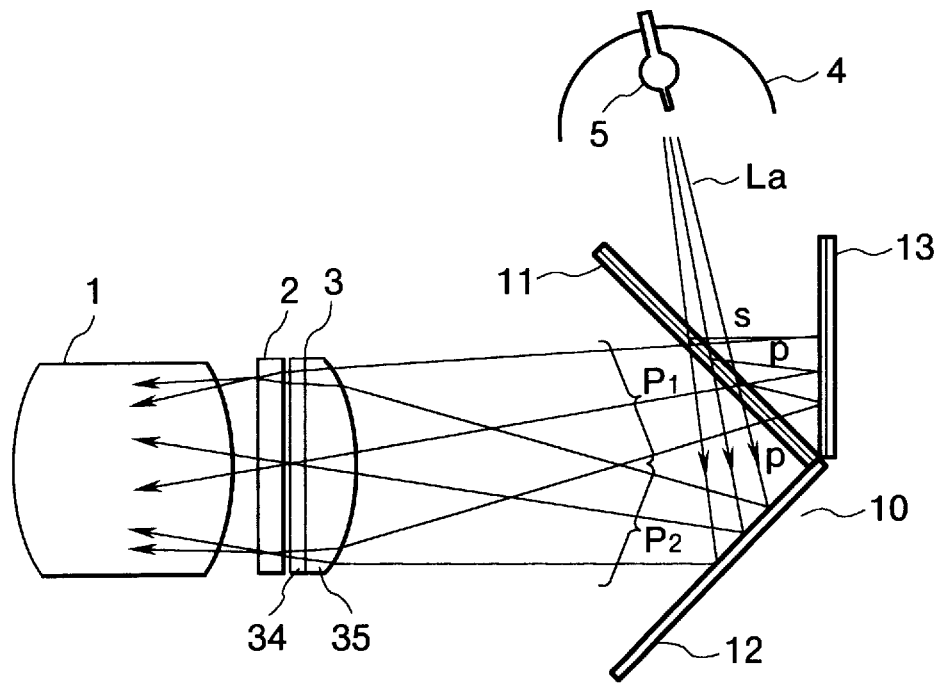
FIG. 2 is a plan view showing the essential portions of FIG. 1.
Figure 3:
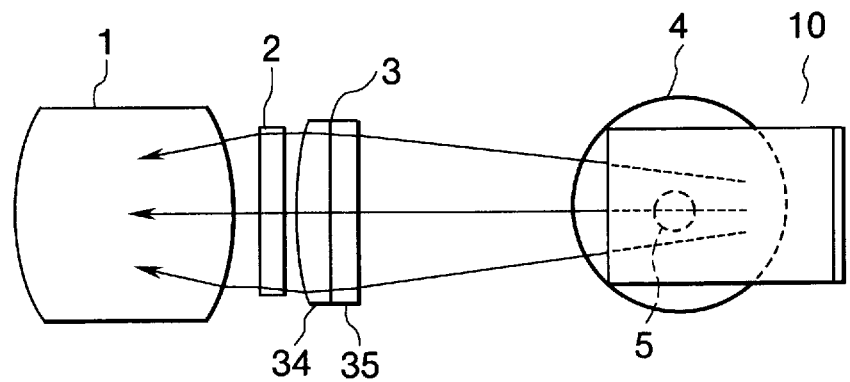
FIG. 3 is a side view showing the essential portions of FIG. 1.

FIG. 1 is a perspective view showing the essential portions of Embodiment 1 of the present invention, FIG. 2 is a plan view showing the essential portions of FIG. 1, and FIG. 3 is a side view showing the essential portions of FIG. 1.

In these figures, the reference numeral 5 designates a white light source (light source means) comprising a metal halide lamp. The reference numeral 4 denotes a reflector comprising a parabolic or otherwise shaped reflecting surface and effectively directing a beam of light La emitted from the white light source 5 toward a polarizing conversion element 10 which will be described later. The polarizing conversion element 10 has the optical function of converting incident beams of light into a polarized beam of light (in the present embodiment, P-polarized light) and causing it to emerge therefrom.

The polarizing conversion element 10 has a polarizing beam splitter 11 for transmitting therethrough P-polarized light P2 of beams of P-polarized light P and S-polarized light S and reflecting the S-polarized light S, a polarizing rotatable element 13 comprising a quarter wavelength plate for converting the S-polarized light S reflected by the polarizing beam splitter 11 into P-polarized light P1 and a reflecting member, and a reflecting mirror 12.

The reference numeral 3 designates condensing means having optical action in which the refractive power differs between two directions orthogonal to each other, and disposed in proximity to a liquid crystal panel 2 on which information such as an image or a character is formed.

In the present embodiment, the condensing means 3 has a cylindrical lens surface 35 having refractive power in a polarizing conversion plane (the plane of the drawing sheet of FIG. 2) and a cylindrical lens surface 34 having refractive power in a plane orthogonal to the polarizing conversion plane (the plane of the drawing sheet of FIG. 3).

Since the expanse of the beam of light in the polarizing conversion plane is greater than the expanse of the beam of light in the plane orthogonal to the polarizing conversion plane, the refractive power of the cylindrical lens surface 35 is stronger than the refractive power of the cylindrical lens surface 34. Each element is set so that the two beams of light P1 and P2 divided by the polarizing conversion element 10 may overlap each other on a projected image 2 which will be described later, through the condensing means 3.

The reference numeral 2 denotes a liquid crystal panel (liquid crystal light valve) of the TN type or like type on which the projected image is formed. Polarizing filters (not shown) of which the directions of polarization are orthogonal to each other are placed forwardly and rearwardly of the liquid crystal panel 2, and the polarizing filter on the entrance side of the liquid crystal panel 2 has optical action as a polarizer for making the beam of illuminating light into completely polarized light, and the polarizing filter on the exit side of the liquid crystal panel 2 has optical action as an analyzer for cutting and modulating the beam of light of which the direction of polarization is not turned by the liquid crystal panel 2.

The reference numeral 1 designates a projection lens as projection means. The projection lens 1 magnifies an image (the original picture of a projected image) formed on the liquid crystal panel 2 at a predetermined magnification and projects it onto the surface of a screen (not shown) which is a surface for projection.

In the present embodiment, the beam of light from the light source 5 including P-polarized light and S-polarized light is caused to emerge as two beams of P-polarized light $P_1$ and $P_2$ by the polarizing conversion element 10 and is directed to the condensing means 3, by which the two beams of light $P_1$ and $P_2$ are condensed with different refractive powers in the polarizing conversion plane and the plane orthogonal thereto and overlappingly illuminate the surface of the liquid crystal panel 2. Image information displayed on the liquid crystal panel 2 is then magnified and projected onto a predetermined surface by the projection lens 1.

As described above, the beams of light from the light source are all made into beams of light of which the directions of polarization coincide with each other when the liquid crystal panel is illuminated by polarized light, and at this time, the liquid crystal panel is illuminated by a beam of light of which the expanse differs between the polarizing conversion plane and the plane orthogonal thereto, through the condensing means, whereby the effective utilization of the beam of light is achieved.

Figure 4:
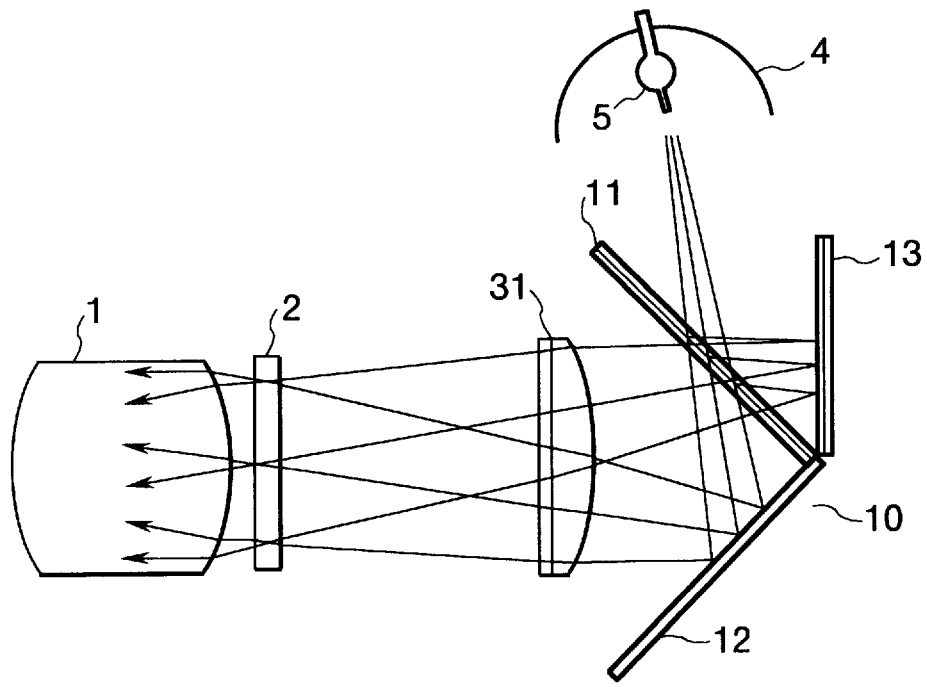
FIG. 4 is a plan view showing the essential portions of Embodiment 2 of the present invention.

FIG. 4 is a plan view showing the essential portions of Embodiment 2 of the present invention. This embodiment differs from Embodiment 1 of FIG. 2 in that condensing means 31 similar in construction to the condensing means 3 is provided on the exit side of the polarizing conversion element 10, and is the same as Embodiment 1 in the other points.

Figure 5:
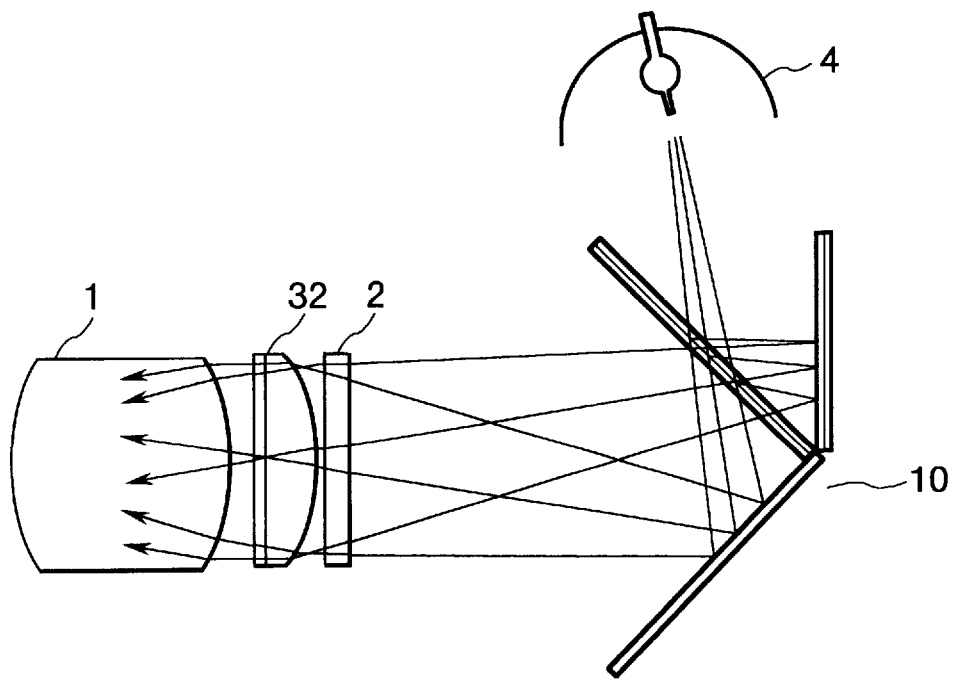
FIG. 5 is a plan view showing the essential portions of Embodiment 3 of the present invention.

FIG. 5 is a plan view showing the essential portions of Embodiment 3 of the present invention. This embodiment differs from Embodiment 1 of FIG. 2 in that condensing means 32 similar in construction to the condensing means 3 is disposed between the projection lens 1 and the liquid crystal panel 2, and is the same as Embodiment 1 in the other points.

In the present embodiment, the projection lens 1 projects the image on the liquid crystal panel 2 through the condensing means 32. Therefore, the projection lens 1 is designed with the optical characteristic of the condensing means 32 taken into account.

Figure 6:
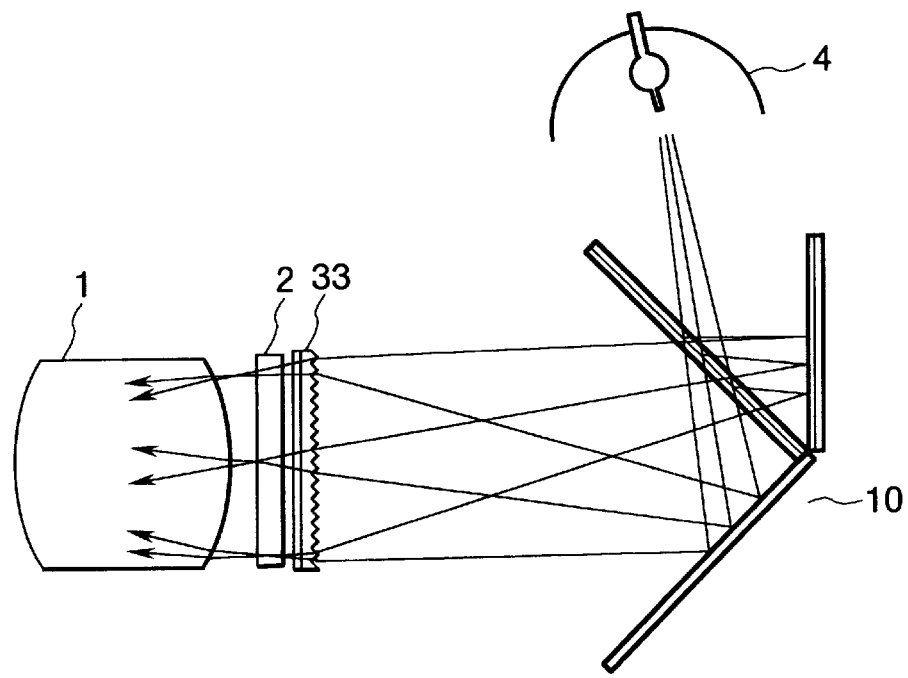
FIG. 6 is a plan view showing the essential portions of Embodiment 4 of the present invention.
Figure 7:
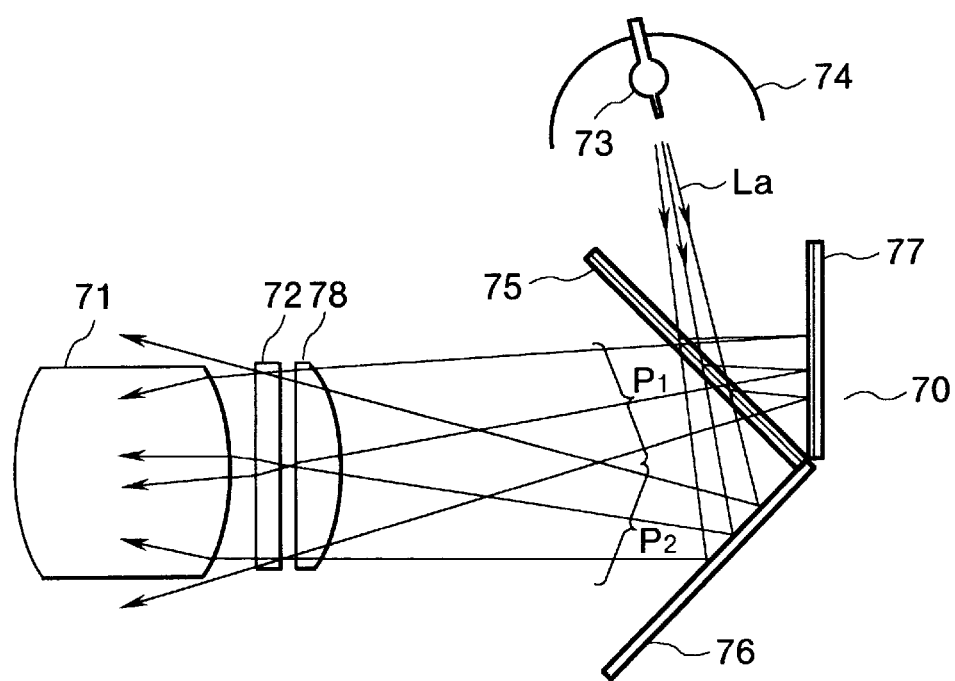
FIG. 7 is a plan view showing the essential portions of a projection apparatus according to the prior art.
Figure 8:
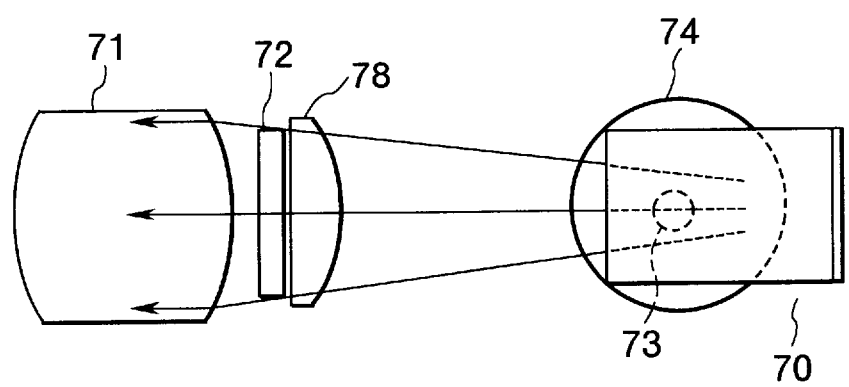
FIG. 8 is a side view showing the essential portions of the projection apparatus according to the prior art.

FIG. 6 is a plan view showing the essential portions of Embodiment 4 of the present invention. This embodiment differs from Embodiment 1 of FIG. 2 in that condensing means 33 is comprised of a fresnel lens of which the refractive power differs between directions orthogonal to each other, and is the same as Embodiment 1 in the other points.

In each of the above-described embodiments, the condensing means may be disposed anywhere between the projection lens and the polarizing conversion element 10.

Also, as a projection apparatus, the present invention is equally applicable to a liquid crystal projector of the multiplate type having liquid crystal panels for red, green and blue.

The condensing means may be one of any shape such a toric lens or an aspherical lens if it is an optical member of which the refractive power differs between directions orthogonal to each other.

According to the present invention, as described above, there can be achieved an illuminating device in which when a projected image is illuminated by a beam of light from a light source emerging with its polarized state uniformized by the use of a polarizing conversion element, utilization is made of condensing means having appropriate refractive power, whereby the effective utilization of the beam of light from the light source is achieved and the projected image is effectively illuminated and thus, a bright projected image can be obtained easily on the surface of a screen, and a projection apparatus using the same.

What is claimed is:

1. An apparatus comprising:

information forming means for forming information;

illuminating means for illuminating said information forming means, said illuminating means including a polarization beam splitter disposed in an optical path in said illuminating means and leading to said information forming means; and optical means disposed near said information forming means for receiving a beam of light output by said illuminating means, said optical means having refracting powers which are different in mutually perpendicular planes for rendering said beam of light output by said illuminating means to have equal expanses in said mutually perpendicular planes, thereby enhancing illumination of the information forming means.

2. An apparatus comprising:

information forming means for forming information;

illuminating means for illuminating said information forming means, said illuminating means including: a polarization beam splitter disposed in an optical path in said illuminating means and leading to said information forming means; and a mirror for reflecting light passed through said polarizing beam splitter into said optical path; and optical means disposed near said information forming means for receiving a beam of light output by said illuminating means, said optical means having refracting powers which are different in mutually perpendicular planes for rendering said beam of light output by said illuminating means to have equal expanses in said mutually perpendicular planes, thereby enhancing illumination of the information forming means.

3. An apparatus comprising:

information forming means for forming information;

illuminating means for illuminating said information forming means, said illuminating means including: a polarization beam splitter disposed in an optical path in said illuminating means and leading to said information forming means; and an optical member for varying the polarized state of light reflected by said polarizing beam splitter and for reflecting polarization state-varied light into said optical path; and optical means disposed near said information forming means for receiving a beam of light output by said illuminating means, said optical means having refracting powers which are different in mutually perpendicular planes for rendering said beam of light output by said illuminating means to have equal expanses in said mutually perpendicular planes, thereby enhancing illumination of the information forming means.

4. An apparatus comprising:

information forming means for forming information; and illuminating means for illuminating said information forming means, said illuminating means comprising
a) light generating means for generating a light beam having a uniform state of polarization, and
b) optical means for receiving said light beam and modifying an expanse of said light beam perpendicular to a polarizing conversion plane of said light generating means in order to equalize expanses of the beam in mutually perpendicular directions.

5. An apparatus according to claim 4, wherein said light generating means includes a polarization beam splitter disposed in an optical path in said illuminating means and leading to said information forming means.

6. An apparatus according to claim 5, wherein said light generating means includes a mirror for reflecting light passed through said polarizing beam splitter into said optical path.

7. An apparatus according to claim 5, wherein said light generating means includes an optical member for varying the polarized state of light reflected by said polarizing beam splitter and for reflecting polarization state-varied light into said optical path.

8. An apparatus according to claim 4, further comprising a projection lens for projecting the information of said illuminated information forming means.

9. An apparatus according to claim 4, wherein said optical means defines first and second surfaces, both of which are cylindrical surfaces.

10. An apparatus comprising:

information forming means for forming information;

illuminating means for illuminating said information forming means including a polarization beam splitter disposed in an optical path in said illuminating means and leading to said information forming means; and optical means disposed near said information forming means for rendering a beam of light output by said illuminating means to have equal expanses in mutually perpendicular planes.

11. An apparatus comprising:

information forming means for forming information;

illuminating means for illuminating said information forming means including a polarization beam splitter disposed in an optical path in said illuminating means and leading to said information forming means; and optical means disposed near said information forming means for relaying illuminating light of said illuminating means toward said information forming means wherein refracting powers of said optical means in mutually perpendicular planes are different for rendering said illuminating light to have equal expanses in mutually perpendicular directions, thereby enhancing illumination of the information forming means.

12. An apparatus according to claim 11, wherein said illuminating means includes a polarization beam splitter disposed in an optical path in said illuminating means and leading to said information forming means.

13. An apparatus according to claim 12, wherein said illuminating means includes a mirror for reflecting light passed through said polarizing beam splitter into said optical path.

14. An apparatus according to claim 12, wherein said illuminating means includes an optical member for varying the polarized state of light reflected by said polarizing beam splitter and for reflecting polarization state-varied light into said optical path.

15. An apparatus comprising:

information forming means for forming information;

illuminating means for illuminating said information forming means and including a polarization beam splitter disposed in an optical path in said illuminating means and leading to said information forming means; and optical means disposed near said information forming means for receiving a beam of light output by said illuminating means, said optical means having refracting powers which are different in mutually perpendicular planes for rendering said beam of light output by said illuminating means to have equal expanses in said mutually perpendicular planes, thereby enhancing illumination of the information forming means.

* * * * *